(12) United States Patent
Tokuda

(10) Patent No.: US 7,804,664 B1
(45) Date of Patent: Sep. 28, 2010

(54) LAMINATE BEAM TRANSITION HEADLIFT FOR A DISK DRIVE HEAD SUSPENSION

(75) Inventor: Allan D. Tokuda, Huchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 689 days.

(21) Appl. No.: 11/779,053

(22) Filed: Jul. 17, 2007

(51) Int. Cl.
G11B 5/54 (2006.01)
(52) U.S. Cl. .................. 360/255; 360/254.6
(58) Field of Classification Search ............ 360/254.6, 360/255, 254.3, 254.7
See application file for complete search history.

(56) References Cited

U.S. PATENT DOCUMENTS

| | | | |
|---|---|---|---|
| 5,027,241 | A | 6/1991 | Hatch et al. |
| 5,187,625 | A | 2/1993 | Blaeser et al. |
| 5,291,359 | A | 3/1994 | Wolter |
| 5,339,208 | A | 8/1994 | Yumura et al. |
| 5,463,514 | A | 10/1995 | Yaeger |
| 5,471,734 | A | 12/1995 | Hatch et al. |
| 5,526,206 | A | 6/1996 | Shimizu |
| 5,585,980 | A * | 12/1996 | Boutaghou ............ 360/255 |
| 5,734,526 | A | 3/1998 | Symons |
| 5,739,982 | A | 4/1998 | Arya et al. |
| 5,793,569 | A | 8/1998 | Christianson et al. |
| 5,850,319 | A | 12/1998 | Tangren |
| 5,862,010 | A | 1/1999 | Simmons et al. |
| 5,894,655 | A | 4/1999 | Symons |
| 5,969,906 | A | 10/1999 | Arya et al. |
| 6,023,574 | A | 2/2000 | Tangren |
| 6,052,258 | A | 4/2000 | Albrecht et al. |
| 6,151,197 | A | 11/2000 | Larson et al. |
| 6,157,520 | A | 12/2000 | Mangold et al. |
| 6,181,529 | B1 | 1/2001 | Aoyagi et al. |
| 6,215,622 | B1 | 4/2001 | Ruiz et al. |
| 6,219,203 | B1 | 4/2001 | Arya et al. |
| 6,239,953 | B1 | 5/2001 | Mei |
| 6,278,585 | B1 | 8/2001 | Olson et al. |
| 6,292,333 | B1 * | 9/2001 | Blumentritt et al. ...... 360/254.8 |
| 6,351,348 | B1 | 2/2002 | Erpelding et al. |

(Continued)

FOREIGN PATENT DOCUMENTS

JP 01107384 4/1989

(Continued)

OTHER PUBLICATIONS

HTI Product Brochure entitled "HTI Suspension Concept: Cirrus," dated Sep. 17, 2004, 1 pg.

(Continued)

*Primary Examiner*—Jefferson Evans
(74) *Attorney, Agent, or Firm*—Faegre & Benson LLP

(57) ABSTRACT

A headlift for a disk drive head suspension extending from a planar base region on a load beam of the head suspension. The headlift is formed from first and second layers of relatively stiff metal separated by a layer of polymer. The headlift includes a headlift tab and a stiffener extending over at least a portion of the headlift tab. The headlift tab includes a convex headlift region formed out of one of the two metal layers. The stiffener is formed from one of the two metal layers or from a combination of the polymer layer and one of the two metal layers.

17 Claims, 4 Drawing Sheets

U.S. PATENT DOCUMENTS

| | | |
|---|---|---|
| 6,362,933 B1 | 3/2002 | Sampietro et al. |
| 6,463,514 B1 | 10/2002 | Ray et al. |
| 6,483,670 B1 | 11/2002 | Watanabe |
| 6,538,850 B1 | 3/2003 | Hadian et al. |
| 6,617,542 B2 | 9/2003 | Hayen et al. |
| 6,700,745 B2 | 3/2004 | Shiraishi |
| 6,757,137 B1 | 6/2004 | Mei |
| 6,785,094 B2 | 8/2004 | Arya et al. |
| 6,977,798 B2 | 12/2005 | Schulz et al. |
| 7,110,221 B2 * | 9/2006 | Kuwajima et al. ....... 360/254.7 |
| 7,365,945 B2 * | 4/2008 | Fujimoto et al. ............ 360/255 |
| 7,706,106 B1 * | 4/2010 | Mei et al. ................... 360/255 |
| 2002/0109943 A1 | 8/2002 | Crane et al. |
| 2003/0002220 A1 | 1/2003 | Nojima |
| 2003/0202282 A1 | 10/2003 | Arya |
| 2004/0120076 A1 | 6/2004 | Takagi et al. |
| 2005/0030671 A1 | 2/2005 | Lee et al. |
| 2005/0052784 A1 | 3/2005 | Inoue et al. |
| 2005/0188531 A1 | 9/2005 | Shu et al. |
| 2005/0201014 A1 | 9/2005 | Fujimoto et al. |
| 2006/0171079 A1 * | 8/2006 | Tada et al. ................... 360/255 |
| 2006/0285253 A1 * | 12/2006 | Isom et al. ................ 360/244.3 |

FOREIGN PATENT DOCUMENTS

| | | |
|---|---|---|
| JP | 2000011571 | 1/2000 |
| JP | 2005011511 | 1/2005 |
| KR | 98004812 | 6/1996 |

OTHER PUBLICATIONS

HTI Product Brochure entitled "HTI Suspension Concept: Stratus," dated Sep. 17, 2004, 1 pg.

Diskcon 2004 Presentation: "Suspension Design Progression for Increasing Shock Performance," Sep. 2004, 21 pp.

* cited by examiner

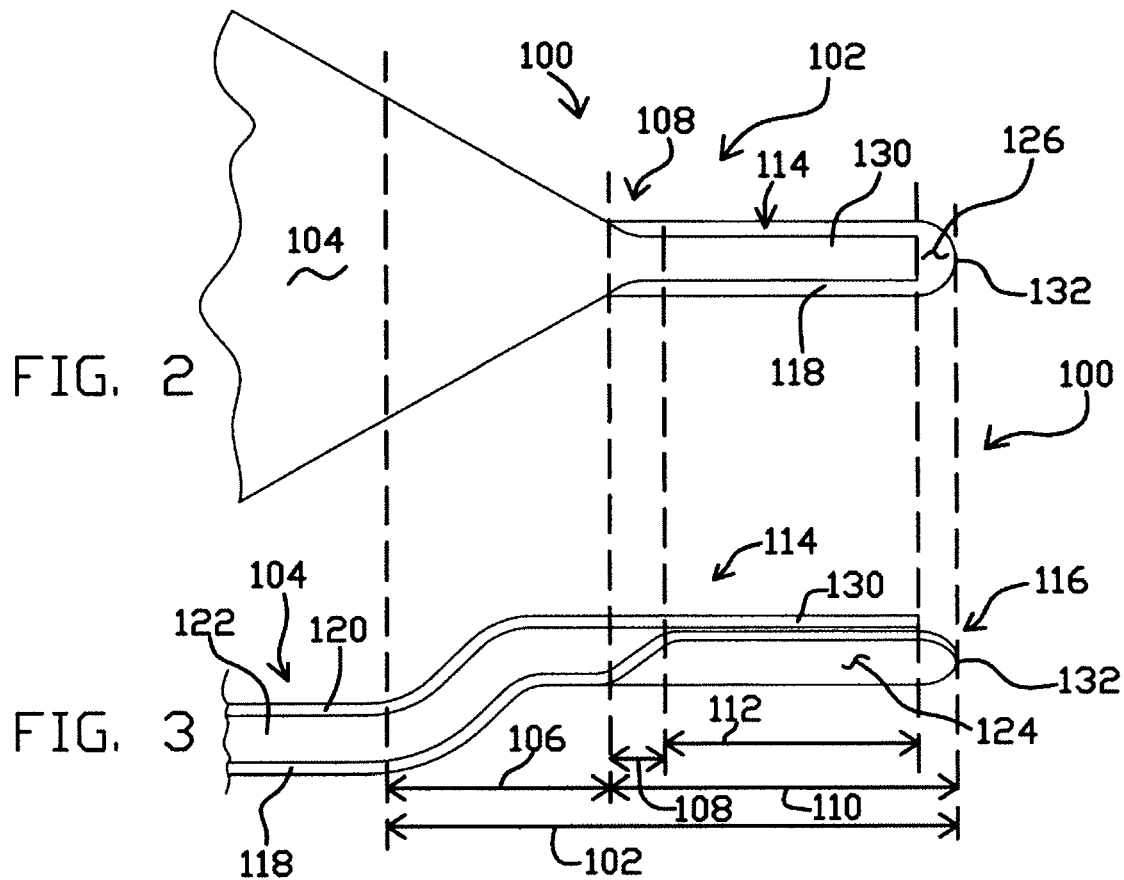
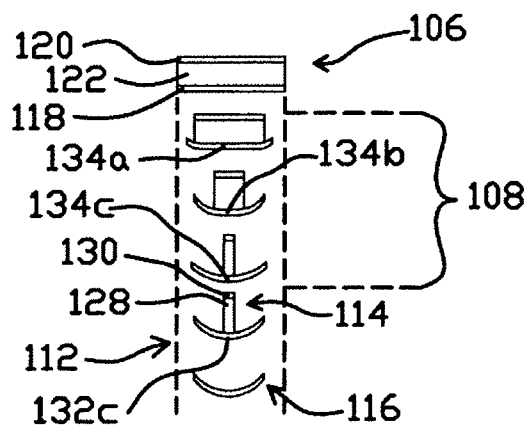
FIG. 4

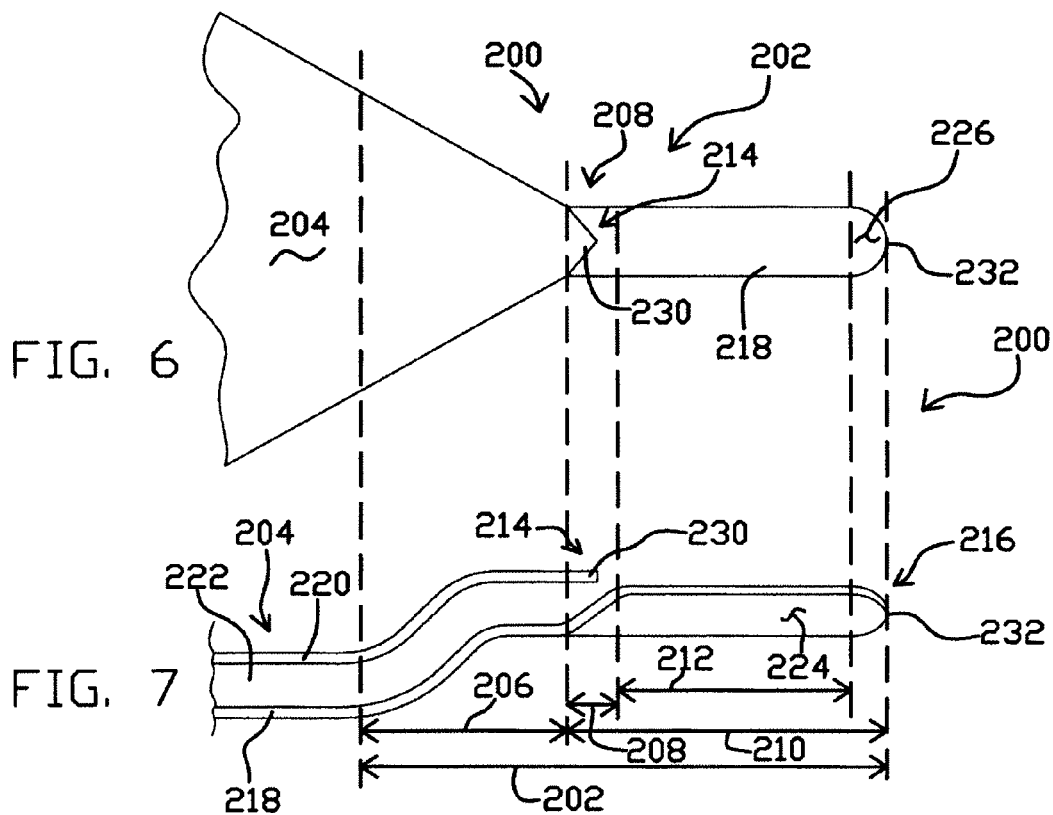
FIG. 6
FIG. 7
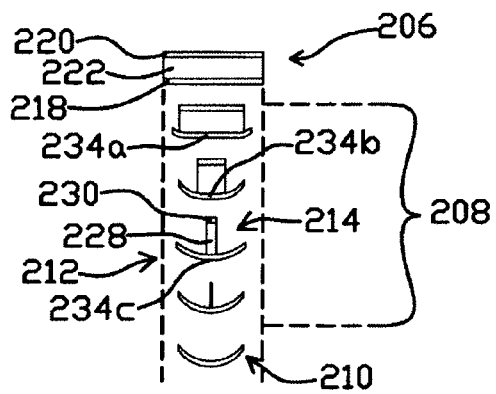
FIG. 8

LAMINATE BEAM TRANSITION HEADLIFT FOR A DISK DRIVE HEAD SUSPENSION

FIELD OF THE INVENTION

The invention is a headlift for a disk drive head suspension.

BACKGROUND OF THE INVENTION

Disk drive head suspension load beams having headlifts are generally known and disclosed, for example, in a document entitled Headlifts distributed by Hutchinson Technology Incorporated at the Diskcon trade show in September, 2004. Load beams formed from laminates including first and second layers of stainless steel separated by a polymer layer are also known and disclosed, for example, in documents entitled Advanced Concept: Load Beams, HTI Suspension Concept: Cirrus and HTI Suspension Concept Stratus, distributed by Hutchinson Technology Incorporated at the Diskon trade show in September, 2004. These load beams include headlifts formed from one of the stainless steel layers extending from the distal ends of the load beams.

There remains, however, a continuing need for disk drive headlifts with improved performance that are also efficient to manufacture. In particular, there is a need for strong headlifts for laminate load beams.

SUMMARY OF THE INVENTION

The invention is a head suspension component having a relatively strong headlift that is resistant to bending and twisting when loaded. In one embodiment of the invention, the headlift includes first and second layers of relatively stiff metal separated by a layer of polymer. The first metal layer includes a first and second opposite surfaces, a base region, and a headlift tab having a convex lift region on the first surface extending from the base region. The polymer layer is on the second surface of the first metal layer and includes a stiffening portion extending from the base region over at least a portion of the headlift tab. The second metal layer is on at least portions of the polymer layer, and includes a stiffening portion extending from the base region over at least a portion of the headlift tab.

BRIEF DESCRIPTION OF THE DRAWINGS

FIG. 2 is a top view of the head suspension load beam of FIG. 1.

FIG. 3 is a side view of the head suspension load beam of FIG. 1.

FIG. 4 shows some cross-sectional views in the transition region of the head suspension load beam of FIG. 1.

FIG. 6 is a top view of the head suspension load beam of FIG. 5.

FIG. 7 is a side view of the head suspension load beam of FIG. 5.

FIG. 8 shows some cross-sectional views in the transition region of the head suspension load beam of FIG. 5.

DETAILED DESCRIPTION OF THE PREFERRED EMBODIMENTS

Figure 1:
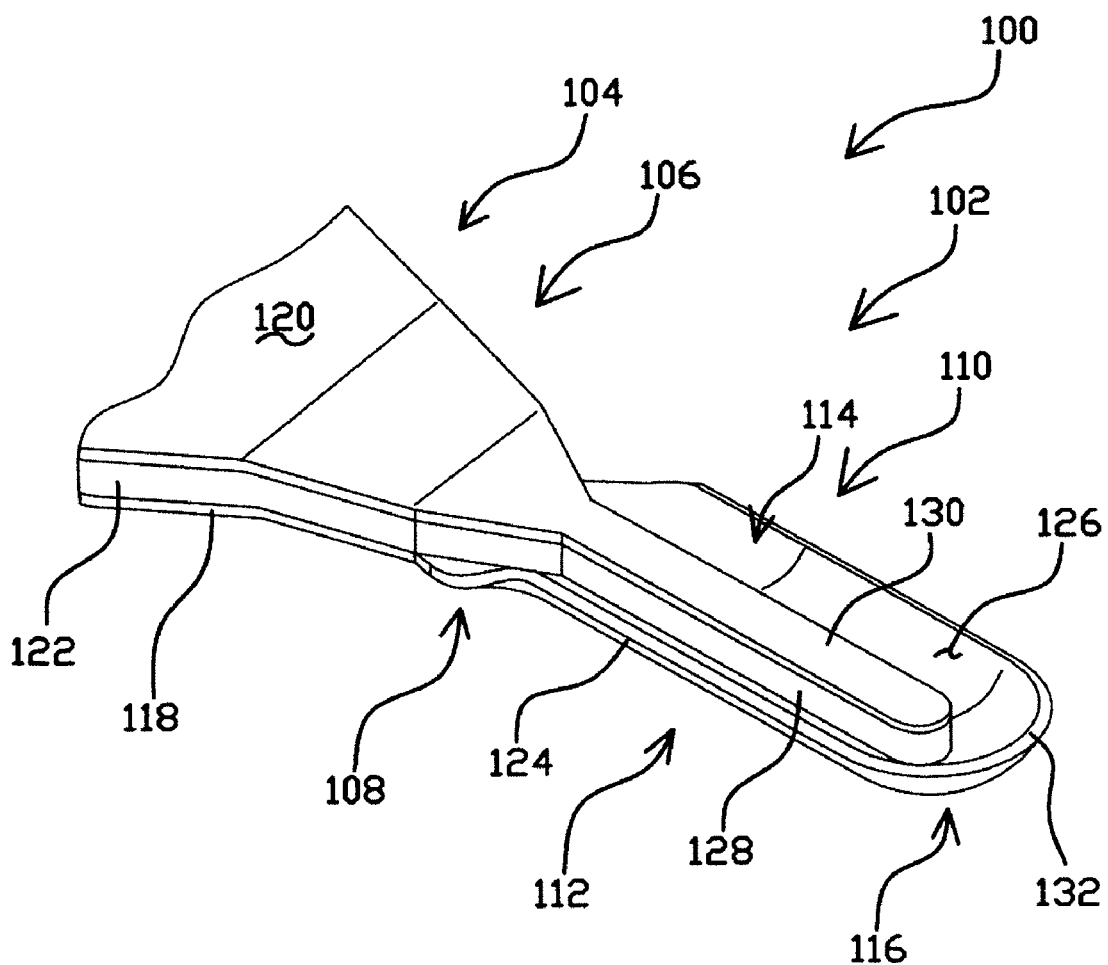
FIG. 1 is a perspective view of a headlift in accordance with one embodiment of the invention.

FIG. 1 illustrates the distal region of a disk drive head suspension load beam 100 having headlift 102 in accordance with one embodiment of the invention. FIGS. 2 and 3, respectively show a top and a side view of load beam 100 shown in FIG. 1. Load beam 100 has a generally planar base region 104 with headlift 102 extending from base region 104. Headlift 102 includes offset region 106 at the distal end of base region 104, headlift tab 110 extending distally from offset region 106, and stiffener 114. Headlift tab 110 includes transition region 108, convex lift region 112, and convex tip region 116.

Base region 104, offset region 106, and headlift tab 110 are shown having first and second layers 118 and 120, respectively, of stainless steel or other relatively stiff metal, and polymer layer 122 or other electrically insulating or etch stop material between first and second metal layers 118 and 120. First metal layer 118 includes first and second opposite surfaces 124 and 126, respectively. Polymer layer 122 covers at least a portion of second surface 126 on first metal layer 118, and second metal layer 120 covers at least a portion of polymer layer 122 on the surface opposite the surface over second surface 126.

Convex lift region 112 is formed from first metal layer 118 and includes a generally convex shaped first surface 124 and a generally concave shaped second surface 126 with stiffener 114 traversing at least a portion of concave shaped second surface 126. As perhaps best illustrated in FIG. 4, convex lift region 112 and stiffener 114 are formed in transition region 108 by selectively etching portions of second metal layer 120 and polymer layer 122 from the three layers 118, 120 and 122 extending distally from offset region 106. In traversing transition region 108, as the distance from offset region 106 increases in the distal direction, the widths of polymer layer 122 and second metal layer 120 narrow, or reduce, exposing second surface 126 of first metal layer 118. Additionally, the portion of first metal layer 118 having exposed second surface 126 changes from a generally planar shape to the convex shape of lift region 112 whereas portion 134 having polymer layer 122 thereon remains generally planar in the illustrated embodiment.

In the embodiment of the invention illustrated in FIGS. 1-4, stiffener 114 is formed in transition region 108 as a distal extension of second metal layer 120 and polymer layer 122 in offset region 106. Stiffener 114 is shown extending from transition region 108 and traversing a substantial length of convex lift region 112. Stiffener 114 includes polymer stiffening portion 128 covering at least a portion of concave shaped second surface 126, and second metal stiffening portion 130 extending over at least a portion of polymer stiffening portion 128. In other embodiments, such as that discussed below in reference to FIGS. 5-8, one or both stiffening portions and/or tips have different shapes and profiles, and traverse less than a substantial length of convex lift region 112.

Headlift tab 110 in the embodiment of FIGS. 1-4 is shown having rounded tip 132 and lift region 112 having a convex shaped first surface 124. The convex shape of lift region 112 provides a suitable lifting surface to contact the disk drive's lift ramp (not shown). In combination with stiffener 114, the convex shape of lift region 112 further enhances the rigidity of headlift tab 110. In alternate embodiments (also not shown), headlift tab 110 has other shapes and profiles for convex lift region 112 and/or the tip 132. Second surface 126 of first metal layer 118 is illustrated having a concave shape over at least a portion of transition region 108. In other embodiments (not shown) second surface 126 is generally planar under polymer layer 122 and/or under polymer stiffening portion 128.

In the embodiment of the invention illustrated in FIGS. 1-4, headlift 102 includes offset region 106 extending between base region 104 and headlift tab 110. Offset region 106 extends headlift tab 110 out of the plane of base region 104 in what is known as the z-direction from the plane of load beam 100. The direction and the extent of the offset resulting from offset region 106 is typically selected such that headlift tab 110 extends away from the surface of a disk (not shown) when load beam 100 is mounted for use in a disk drive (also not shown). In still other embodiments (also not shown), headlift 102 does not include offset region 106.

Figure 5:
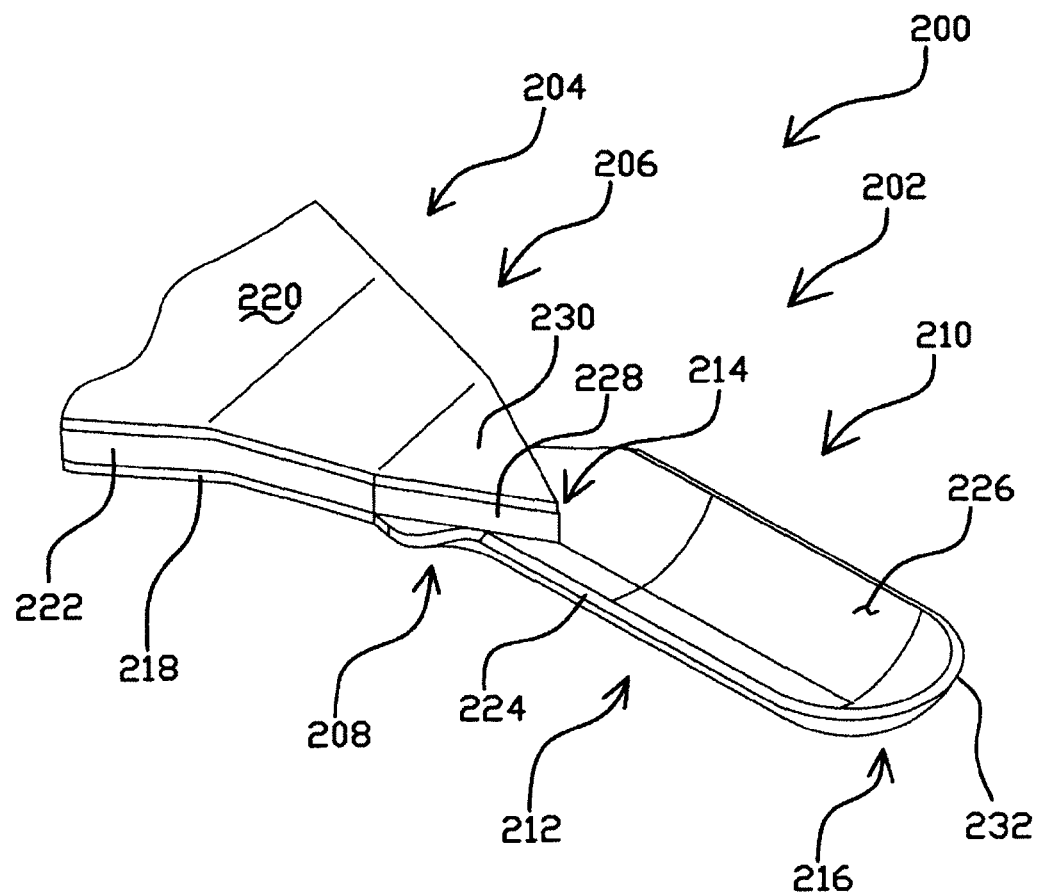
FIG. 5 is a perspective view of a headlift in accordance with another embodiment of the invention.

FIG. 5 illustrates the distal region of a disk drive head suspension load beam 200 having headlift 202 in accordance with another embodiment of the invention. FIGS. 6 and 7, respectively show a top and a side view of load beam 200 shown in FIG. 5. Headlift 202 is similar to the embodiment of headlift 102 described hereinabove with reference to FIGS. 1-4. Accordingly, similar features between these embodiments are labeled with similar reference numerals in the "1xx" and "2xx" series in FIGS. 1-4 and 5-8, respectively.

In the embodiment illustrated in FIGS. 5-8, the width of stiffener 214 decreases with increasing distance from offset region 206 as stiffener 214 traverses transition region 208. In an alternate embodiment, stiffener 214 extends a relatively short distance along the concave shaped second surface 226 of convex lift region 212.

In accordance with an embodiment of the invention, headlifts are formed from the same laminated sheet of material as that used in the manufacture of load beams in a disk drive head suspension. Headlifts of the instant invention can be incorporated with different load beam structures (not shown) manufactured from laminated material, and also onto other conventional or otherwise known load beams such as those manufactured from a single sheet of metal. The laminate stiffness is also maintained intact through the distal end of the headlift since all layers of the laminate are formed. The headlifts can also be efficiently manufactured using conventional or otherwise known photolithography and etching processes, and mechanical bending, forming or stamping processes. Alternatively, the headlifts can be manufactured by additive processes. Headlifts in accordance with the invention offer a number of advantages such as ease in parking and unparking the head suspension.

Although the present invention has been described with reference to preferred embodiments, those skilled in the art will recognize that changes can be made in form and detail without departing from the spirit and scope of the invention.

What is claimed is:

1. A disk drive head suspension component having a headlift, comprising:
a first relatively stiff metal layer having first and second opposite surfaces, including:
a base region; and
a headlift tab extending from the base region and having a convex lift region on the first surface; and
a polymer layer on the second surface of the first metal layer, including a stiffening portion extending from the base region over at least a portion of the tab; and
a second relatively stiff metal layer on at least portions of the polymer layer, including a stiffening portion extending from the base region over at least a portion of the tab.

2. The head suspension component of claim 1 wherein:
the stiffening portion of the polymer layer extends over at least a portion of the convex lift region of the headlift tab; and
the stiffening portion of the second metal layer extends over at least a portion of the convex lift region of the headlift tab.

3. The head suspension component of claim 1 wherein:
the lift region of the headlift tab is at a z-height spaced from the base region; and
the headlift tab further includes an offset region extending between the base region and lift region.

4. The head suspension component of claim 3 wherein:
the stiffening portion of the polymer layer extends over at least a portion of the offset region of the headlift tab; and
the stiffening portion of the second metal layer extends over at least a portion of the offset region of the headlift tab.

5. The head suspension component of claim 4 wherein:
the stiffening portion of the polymer layer extends over at least a portion of the convex lift region of the headlift tab; and
the stiffening portion of the second metal layer extends over at least a portion of the convex lift region of the headlift tab.

6. The head suspension component of claim 5 wherein:
the stiffening portion of the polymer layer extends over a substantial portion of the length of the convex lift region of the headlift tab; and
the stiffening portion of the second metal layer extends over a substantial portion of the length of the convex lift region of the headlift tab.

7. The head suspension component of claim 6 wherein a width of the stiffening portion of the second metal layer narrows with increasing distance from the base region.

8. The head suspension component of claim 7 wherein the second surface of the headlift tab opposite the convex lift region is a concave surface.

9. The head suspension component of claim 8 wherein at least a portion of the offset region of the headlift tab has a concave second surface.

10. The head suspension component of claim 4 wherein a width of the stiffening portion of the second metal layer narrows with increasing distance from the base region.

11. The head suspension component of claim 1 wherein a width of the stiffening portion of the second metal layer narrows with increasing distance from the base region.

12. The head suspension component of claim 1 wherein the first and second metal layers are stainless steel layers.

13. The head suspension component of claim 1 wherein the first metal layer geometrically transitions from a substantially flat surface in the base region to a convex surface in the lift region.

14. A disk drive head suspension component, comprising:
a metal base region including first and second stainless steel layers separated by a polyimide layer; and
a headlift extending from the base region, including:
a tab formed from the first stainless steel layer and having a lift region with concave surface; and
a stiffener on the concave surface of the tab formed from the second stainless steel layer and the polyimide layer.

15. The disk drive head suspension of claim 14 wherein the stiffener extends over a substantial portion of the length of the tab.

16. The disk drive head suspension of claim 14 wherein the stiffener has a width that narrows with increasing distance from the base region.

17. The disk drive head suspension of claim 14 wherein:
the lift region of the headlift tab is at a z-height spaced from the base region; and
the headlift tab further includes an offset region extending between the base region and lift region.

\* \* \* \* \*